W. P. DUNLAP.
CULTIVATOR.
APPLICATION FILED FEB. 20, 1908.
918,298.
Patented Apr. 13, 1909.
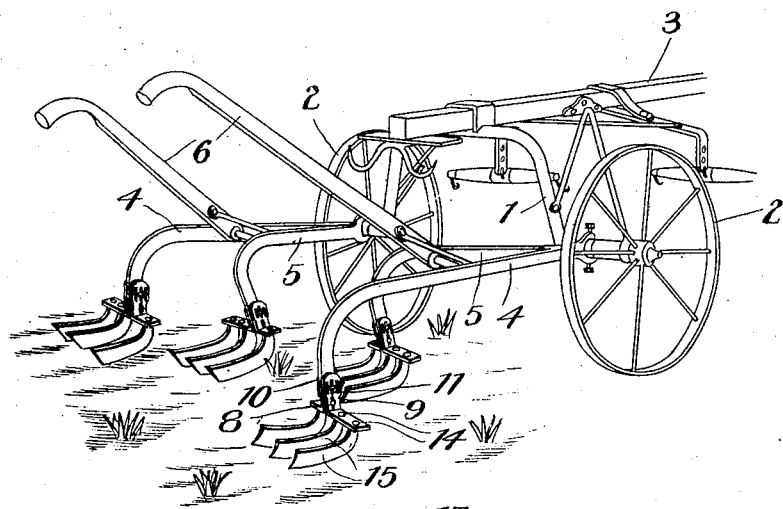
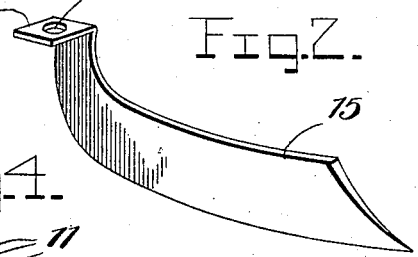
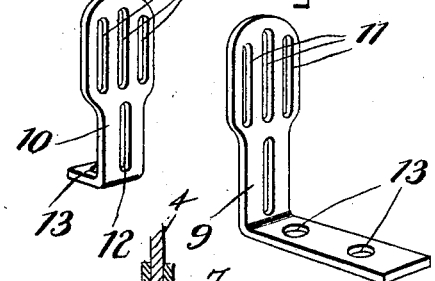
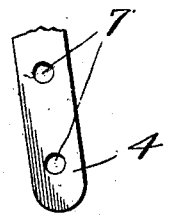
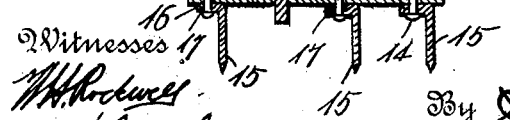
Inventor
W. P. Dunlap

UNITED STATES PATENT OFFICE.

WILLIAM P. DUNLAP, OF MAQUOKETA, IOWA.

CULTIVATOR.

No. 918,298.　　　Specification of Letters Patent.　　　Patented April 13, 1909.

Application filed February 20, 1908. Serial No. 416,944.

*To all whom it may concern:*

Be it known that I, WILLIAM P. DUNLAP, a citizen of the United States, residing at Maquoketa, in the county of Jackson and State of Iowa, have invented certain new and useful Improvements in Cultivators; and I do declare the following to be a full, clear, and exact description of the invention, such as will enable others skilled in the art to which it appertains to make and use the same.

My invention relates to cultivators, and the object of the invention is to provide an attachment for beam plows whereby the plow may be used as a soil pulverizer.

A further object of the invention is to obtain proper adjustment of the cultivator blades so as to compensate for hard or soft ground and for deep or shallow cutting.

Further objects of the invention will appear as the specific description which follows is read in connection with the accompanying drawings which form a part of this application, and in which, Figure 1 is a perspective view of a beam plow with the cultivator blades attached thereto; Fig. 2 is a perspective detail view of one of the cutter blades; and Figs. 3 and 4 are respectively perspective views of the right and left-hand angle mounting irons. Fig. 5 is a detail perspective view of the end of one of the plow beams, and Fig. 6 is a detail section of the attaching plates secured to the beams, and showing the connection of the simitar blades.

Referring more especially to the drawings, 1 represents the ratchet axle of a cultivator upon which are mounted the wheels, 2, and the tongue, 3. Pivoted to the axle, adjacent each wheel and arranged for lateral and vertical movement are two pairs of diverging beams, 4 and 5, the latter of which in each pair is the shorter and is arranged inside the former. Suitable handles, 6, are braced between the pairs of beams and each beam at its rear end is curved downwardly and provided with a pair of transverse holes, 7, through which the attaching bolts, 8, are adapted to pass.

The cultivator attachment comprises a pair of L-shaped angle plates, 9 and 10, both having in their vertical arms a plurality of parallel slots, 11, near their upper ends, and adjacent the angle are provided with a single central slot, 12. The horizontal arms of the attaching plates are provided with a plurality of apertures, 13, to receive attaching bolts, 14. The left-hand forward plate, 10, has its vertical arm substantially identical with the vertical arm of the angle plate, 9, but its horizontal arm is somewhat shorter and is provided with only one aperture for the reception of an attaching bolt.

The cutting blades, which are pivotally attached to the horizontal arms of the angle plates by the bolts, 14, each comprises a curved blade, 15, in the form of a simitar, with a right-angular extension, 16, at its upper end having an aperture, 17, adapted to receive the clamping bolts, 14.

In assembling the device, the blades are secured to the angle plate at the desired angle and the clamping plates are then secured to the curved ends of the beams by suitable bolts. It will be seen that the blades, 15, are adapted to be swung upon the bolts, 14, so as to obtain any desired angle of cut with regard to the line of movement of the plow, and that the bolts, 8, may be inserted in any one of the plurality of slots, 11, so as to change the pitch of the blade with respect to the plane of the horizontal portion of the beams, 4 and 5.

In practice and for general utility, the cultivator blades secured to the outside beams, 4, preferably have their rear ends deflected inwardly, and the cultivator blades on the inner beams, 5, preferably have their blades also deflected inwardly, so as to give all of them a diaognal cut and a tendency to throw the beam upwardly instead of inwardly. The cutter blades may, however, be reversed and their rear ends deflected outwardly, or the cutter blades of one beam may be deflected outwardly and the cutter blades of its associated beam deflected inwardly so as to produce a cross cut.

Having thus fully described my invention, what I claim as new, and desire to secure by Letters-Patent, is:—

1. In combination with pivoted plow beams, of a cultivator attachment therefor comprising a pair of supporting members, means for adjustably securing said members to the ends of the beams of the plow whereby they may have vertical and horizontal movement, and a series of rearwardly extending simitar blades each adjustably secured to the supporting members for lateral swinging.

2. In combination with pivoted plow beams, of a cultivator attachment therefor comprising a pair of angle plates adapted to be adjustably secured to either side of the plow beam with one of their arms projecting at right angles thereto for vertical and horizontal movement with respect to the plow beam, said arms provided with a plurality of apertures, a plurality of simitar blades extending rearwardly from the plates and bolts passing through the apertures in the arms and through the blades for adjustably securing each blade to the arms for lateral swinging.

3. In combination with pivoted plow beams, of a cultivator attachment therefor comprising a pair of angle plates having a plurality of parallel slots adjacent the upper end of one of their arms and a slot in vertical alinement with one of the plurality of slots, the other arm being provided with a series of bolt holes, a plurality of simitar blades having each a horizontal attaching flange at its upper end, bolts passing through the slots in the bottom of the plow to adjustably secure the plates to the beams, and bolts passing through the holes in the plates and the horizontal flanges on the blades to adjustably secure them upon the plates for lateral swinging.

In testimony whereof I have hereunto set my hand in presence of two subscribing witnesses.

WILLIAM P. DUNLAP.

Witnesses:
CLEAVELAND E. DUFFIN,
FRED. M. ALDEN.